(12) United States Patent
Kamiya

(10) Patent No.: US 11,378,643 B2
(45) Date of Patent: Jul. 5, 2022

(54) POSITION DETECTION SYSTEM

(71) Applicant: RFLOCUS INC., Tokyo (JP)

(72) Inventor: Hajime Kamiya, Tokyo (JP)

(73) Assignee: RFLOCUS INC., Tokyo (JP)

( * ) Notice: Subject to any disclaimer, the term of this patent is extended or adjusted under 35 U.S.C. 154(b) by 0 days.

(21) Appl. No.: 17/298,934

(22) PCT Filed: Jul. 6, 2020

(86) PCT No.: PCT/JP2020/026343
§ 371 (c)(1),
(2) Date: Jun. 1, 2021

(87) PCT Pub. No.: WO2021/010202
PCT Pub. Date: Jan. 21, 2021

(65) Prior Publication Data
US 2021/0356551 A1    Nov. 18, 2021

(30) Foreign Application Priority Data

Jul. 16, 2019  (JP) .............................. JP2019-131364
Nov. 28, 2019  (JP) .............................. JP2019-215776

(51) Int. Cl.
*G06K 7/08*    (2006.01)
*G01S 5/02*    (2010.01)
*B65G 1/137*   (2006.01)
*G06K 7/10*    (2006.01)

(52) U.S. Cl.
CPC .......... *G01S 5/0269* (2020.05); *B65G 1/1371* (2013.01); *G06K 7/10366* (2013.01)

(58) Field of Classification Search
CPC .. G01S 5/0269; B65G 1/1371; G06K 7/10366
USPC ........................................................ 235/451
See application file for complete search history.

(56) References Cited

U.S. PATENT DOCUMENTS

| 7,057,511 B2 * | 6/2006 | Shanks ................ G06K 7/0008 |
| | | 340/572.1 |
| 2018/0003812 A1 | 1/2018 | Kamiya |
| 2018/0059208 A1 | 3/2018 | Hamada |
| 2018/0307877 A1 | 10/2018 | Sundaresan et al. |
| 2020/0034583 A1 * | 1/2020 | Nikitin ............... G06K 7/10475 |
| 2021/0264119 A1 * | 8/2021 | Suzuki ................ H01Q 1/2208 |

FOREIGN PATENT DOCUMENTS

| JP | 2005-320074 A | 11/2005 |
| JP | 2010-89844 A | 4/2010 |
| JP | 2014-058403 A | 4/2014 |

(Continued)

*Primary Examiner* — Ahshik Kim
(74) *Attorney, Agent, or Firm* — Muncy, Geissler, Olds & Lowe, P.C.

(57) ABSTRACT

A position detection system 1 identifies position information on the basis of a position signal received from a storage medium 30P disposed in a placement area where a target item is placed, identifies item information on the basis of an item signal received from a storage medium 30Q attached to the target item, and associates the position information with the item information and stores the associated information when the item signal is received during a period of time that starts from a time at which the position information is identified and that does not exceed a predetermined length of time.

6 Claims, 14 Drawing Sheets

(56) References Cited

FOREIGN PATENT DOCUMENTS

| | | |
|---|---|---|
| JP | 5987187 B1 | 9/2016 |
| JP | 2017-021806 A | 1/2017 |
| JP | 2018-078619 A | 5/2018 |
| KR | 10-2009-0021600 A | 3/2009 |
| WO | WO-2006070563 A1 | 7/2006 |
| WO | WO-2016/158105 A1 | 10/2016 |

* cited by examiner

FIG. 5

| ITEM NO. | YEAR/MONTH/DAY | HOUR/MINUTE/SECOND | ID OF POSITION RFID TAG | X-COORDINATE | Y-COORDINATE |
|---|---|---|---|---|---|
| 1 | 2019/8/1 | 13:22:10 | A1 | 0.6 | 5.4 |
| 2 | 2019/8/1 | 13:22:15 | A2 | 1.2 | 5.4 |
| 3 | 2019/8/1 | 13:22:20 | A3 | 1.8 | 5.4 |
| 4 | 2019/8/1 | 13:22:25 | B1 | 1.8 | 1.2 |
| 5 | 2019/8/1 | 13:22:30 | A4 | 4.2 | 5.4 |
| 6 | 2019/8/1 | 13:22:35 | A5 | 4.8 | 5.4 |

FIG. 7

| ITEM NO. | YEAR/MONTH/DAY | HOUR/MINUTE/SECOND | ID OF POSITION RFID TAG | X-COORDINATE | Y-COORDINATE |
|---|---|---|---|---|---|
| 1 | 2019/8/1 | 14:25:10 | C1 | 6.2 | 3.0 |
| 2 | 2019/8/1 | 14:25:15 | C2 | 5.2 | 3.0 |
| 3 | 2019/8/1 | 14:25:20 | D2 | 5.2 | 1.2 |
| 4 | 2019/8/1 | 14:25:25 | C3 | 4.2 | 3.0 |

FIG. 8

| ITEM NO. | YEAR/MONTH/DAY | HOUR/MINUTE/SECOND | ID OF POSITION RFID TAG | X-COORDINATE | Y-COORDINATE |
|---|---|---|---|---|---|
| 1 | 2019/8/1 | 14:53:42 | D1 | 4.2 | 1.2 |
| 2 | 2019/8/1 | 14:53:47 | D2 | 5.2 | 1.2 |
| 3 | 2019/8/1 | 14:53:52 | C2 | 5.2 | 3.0 |
| 4 | 2019/8/1 | 14:53:57 | D3 | 6.2 | 1.2 |

FIG. 9

| AISLE NO. | ID OF POSITION RFID TAG |
|---|---|
| AISLE 1 | A1, A2, A3, A4, A5 |
| AISLE 2 | B1, B2 |
| AISLE 3 | C1, C2, C3 |
| AISLE 4 | D1, D2, D3 |

FIG. 10

| ITEM NO. | YEAR/MONTH/DAY | HOUR/MINUTE/SECOND | ID OF PRODUCT RFID TAG | RSSI(dBm) |
|---|---|---|---|---|
| ⋮ | ⋮ | ⋮ | ⋮ | ⋮ |
| 15 | 2019/8/1 | 14:25:15 | a1 | −73 |
| ⋮ | ⋮ | ⋮ | ⋮ | ⋮ |
| 28 | 2019/8/1 | 14:53:47 | a1 | −58 |
| ⋮ | ⋮ | ⋮ | ⋮ | ⋮ |

FIG. 12

| ITEM NO. | YEAR/MONTH/DAY | HOUR/MINUTE/SECOND | ID OF POSITION RFID TAG | X-COORDINATE | Y-COORDINATE |
|---|---|---|---|---|---|
| 1 | 2019/9/1 | 13:14:50 | E3 | 1.8 | 5.4 |
| 2 | 2019/9/1 | 13:14:51 | E1 | 0.6 | 5.4 |
| 3 | 2019/9/1 | 13:14:52 | E3 | 1.8 | 5.4 |
| 4 | 2019/9/1 | 13:14:53 | E5 | 3.0 | 5.4 |
| 5 | 2019/9/1 | 13:14:54 | E3 | 1.8 | 5.4 |

FIG. 13

| ITEM NO. | YEAR/MONTH/DAY | HOUR/MINUTE/SECOND | ID OF POSITION RFID TAG | | X-COORDINATE | Y-COORDINATE |
|---|---|---|---|---|---|---|
| 1 | 2019/9/1 | 13:14:50 | E3 | | 1.8 | 5.4 |
| 2 | 2019/9/1 | 13:14:50.5 | E2 | ★ | 1.2 | 5.4 |
| 3 | 2019/9/1 | 13:14:51 | E1 | | 0.6 | 5.4 |
| 4 | 2019/9/1 | 13:14:51.5 | E2 | ★ | 1.2 | 5.4 |
| 5 | 2019/9/1 | 13:14:52 | E3 | | 1.8 | 5.4 |
| 6 | 2019/9/1 | 13:14:52.5 | E4 | ★ | 2.4 | 5.4 |
| 7 | 2019/9/1 | 13:14:53 | E5 | | 3.0 | 5.4 |
| 8 | 2019/9/1 | 13:14:53.5 | E4 | ★ | 2.4 | 5.4 |
| 9 | 2019/9/1 | 13:14:54 | E3 | | 1.8 | 5.4 |

FIG. 14
ADJACENCY MATRIX

|    | E1 | E2 | E3 | E4 | E5 |
|----|----|----|----|----|----|
| E1 | 0  | 1  | 0  | 0  | 0  |
| E2 | 1  | 0  | 1  | 0  | 0  |
| E3 | 0  | 1  | 0  | 1  | 0  |
| E4 | 0  | 0  | 1  | 0  | 1  |
| E5 | 0  | 0  | 0  | 1  | 0  |

FIG. 15
ADJACENCY LIST

| E1 | is | adjacent to | E2     |
|----|----|-------------|--------|
| E2 | is | adjacent to | E1, E3 |
| E3 | is | adjacent to | E2, E4 |
| E4 | is | adjacent to | E3, E5 |
| E5 | is | adjacent to | E4     |

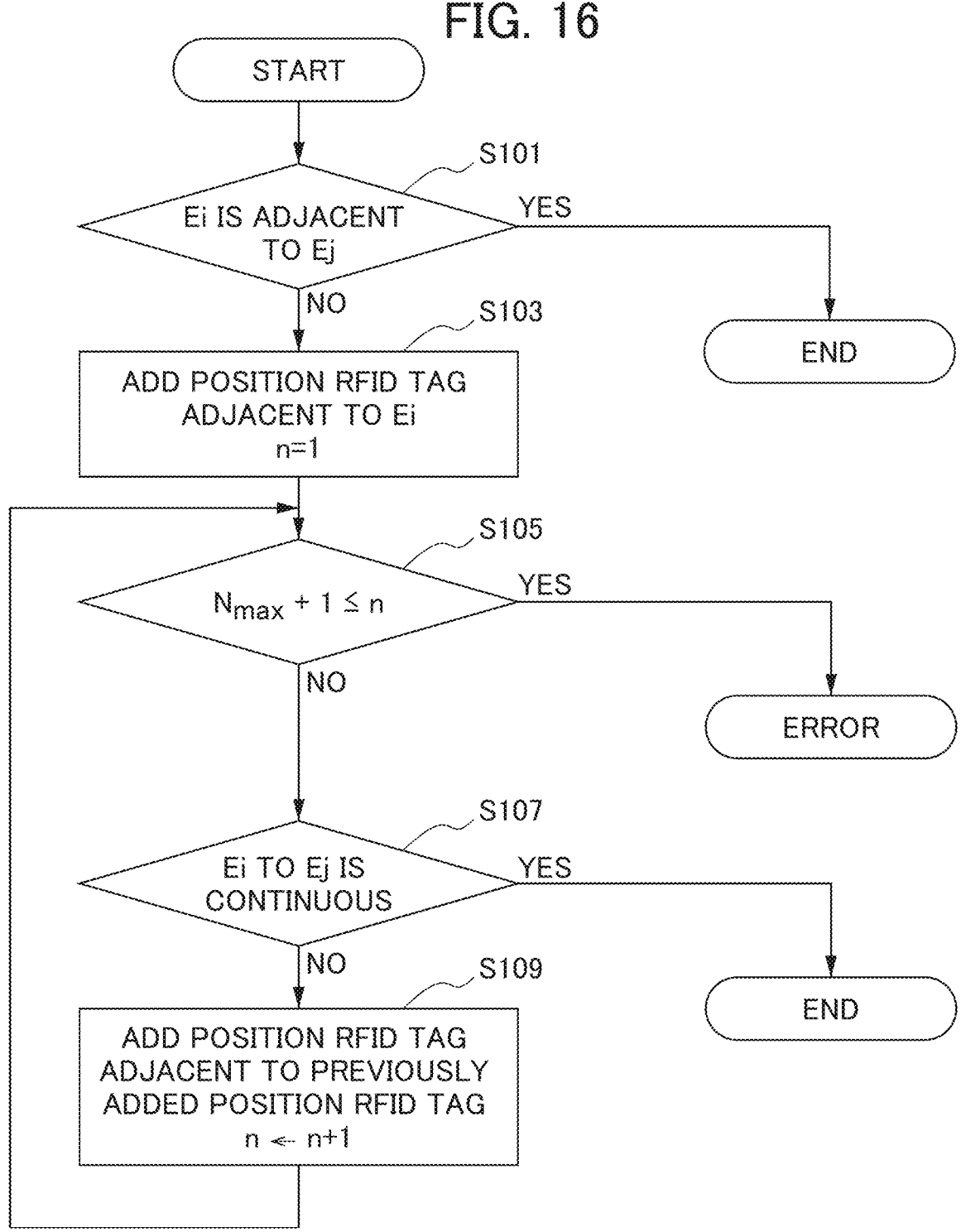

POSITION DETECTION SYSTEM

TECHNICAL FIELD

The present invention relates to a position detection system that detects the position of a storage medium.

BACKGROUND ART

Conventionally, radio frequency identification (RFID) tags are used, for example, by being fixed to products displayed in stores or stored in warehouses. Thus, for example, when a product is sold, a reader reads information such as the product code and the price stored in the tag, whereby the settlement process is performed, and the management of sales performance becomes possible.

In addition, there are cases where it is desired to identify the position of an RFID tag, such as a case where it is desired to find a specific product in a store, a warehouse, or the like. Therefore, for example, Patent Document 1 proposes a method for detecting the direction in which an RFID tag is positioned and the distance to the position of the RFID tag by using a change in phase of radio waves.

Patent Document 1: Japanese Patent No. 5987187

DISCLOSURE OF THE INVENTION

Problems to be Solved by the Invention

The radio waves of an RFID tag are transmitted 300 times per second. In the method for measuring a change in phase described above, the number of RFID tags whose positions can be simultaneously measured is limited. For example, in a store or a distribution base, there is a need for obtaining position information of several hundreds or several thousands of RFID tags, but it is difficult to detect the positions of a large number of RFID tags in a short time by the above-described method.

It is an object of the present invention to provide a position detection system capable of detecting the positions of a large number of storage media in a short time.

Means for Solving the Problems

A position detection system according to the present invention identifies position information based on a position signal received from a storage medium disposed in a placement area where a target item is placed, identifies item information based on an item signal received from a storage medium fixed to the target item, and associates the position information with the item information and stores the associated information when receiving the item signal within a predetermined period of time from a time when the position information was identified.

When the position signals are received from a plurality of the storage media disposed in different placement areas and when a strength or a number of readings of a first position signal is larger than that of a second position signal at more than a predetermined ratio, the position information may be identified based on the first position signal.

When identification of the position information based on the position signal is not completed, the item signal may be filtered.

Adoption or non-adoption of the position information identified may be determined based on one or more identification information of the storage media recorded in advance corresponding to a receiving position at which the position signal is received.

When identification information of the storage medium recorded (included) in the position signal received is not included in one or more of the identification information of the storage media recorded in advance, the position information identified may not be adopted.

The adoption or non-adoption of the position information based on the receiving position at which the position signal is received may be determined based on a direction in which a directivity of an antenna is maximized when the position signal is received.

When there are one or more other placement areas between two placement areas corresponding to two position information temporally continuously detected, position information of the one or more other placement areas may be complemented between the two position information temporally continuously detected.

Effects of the Invention

According to the present invention, it is possible to detect the positions of a large number of storage media in a short time.

BRIEF DESCRIPTION OF THE DRAWINGS

FIG. 5 illustrates an example of the detection results of position RFID tags;

FIG. 7 illustrates an example of the detection results of position RFID tags;

FIG. 8 illustrates an example of the detection results of position RFID tags;

FIG. 9 illustrates an example of an aisle-to-position RFID tag correspondence table;

FIG. 10 illustrates an example of the detection results of product RFID tags;

FIG. 12 illustrates an example of the detection results of position RFID tags;

FIG. 13 illustrates an example of the detection results of position RFID tags in which complement was performed;

FIG. 14 illustrates an example of an adjacency matrix;

FIG. 15 illustrates an example of an adjacency list; and

FIG. 16 illustrates an example of an algorithm for performing complementary processing.

PREFERRED MODE FOR CARRYING OUT THE INVENTION

An embodiment of the present invention will be described below. A position detection system 1 in the present embodiment detects the position of an RFID tag, which is an example of a storage medium. RFID tags are typically of a passive type, and are activated by receiving radio waves from an external source, usually a tag reader, and then modulate and transmit the received radio waves based on the information stored in the RFID tags. In addition to the passive type, there is also an active type of RFID tag that has a built-in power source such as a battery and spontaneously transmits radio waves according to the stored information. The present embodiment will be described exemplifying the passive type. Regardless of whether an RFID tag is a passive type or an active type, the RFID tag usually has a user area in which information can be read and written by a user, and can edit the stored information, such as adding, changing, and deleting the information.

Figure 1:
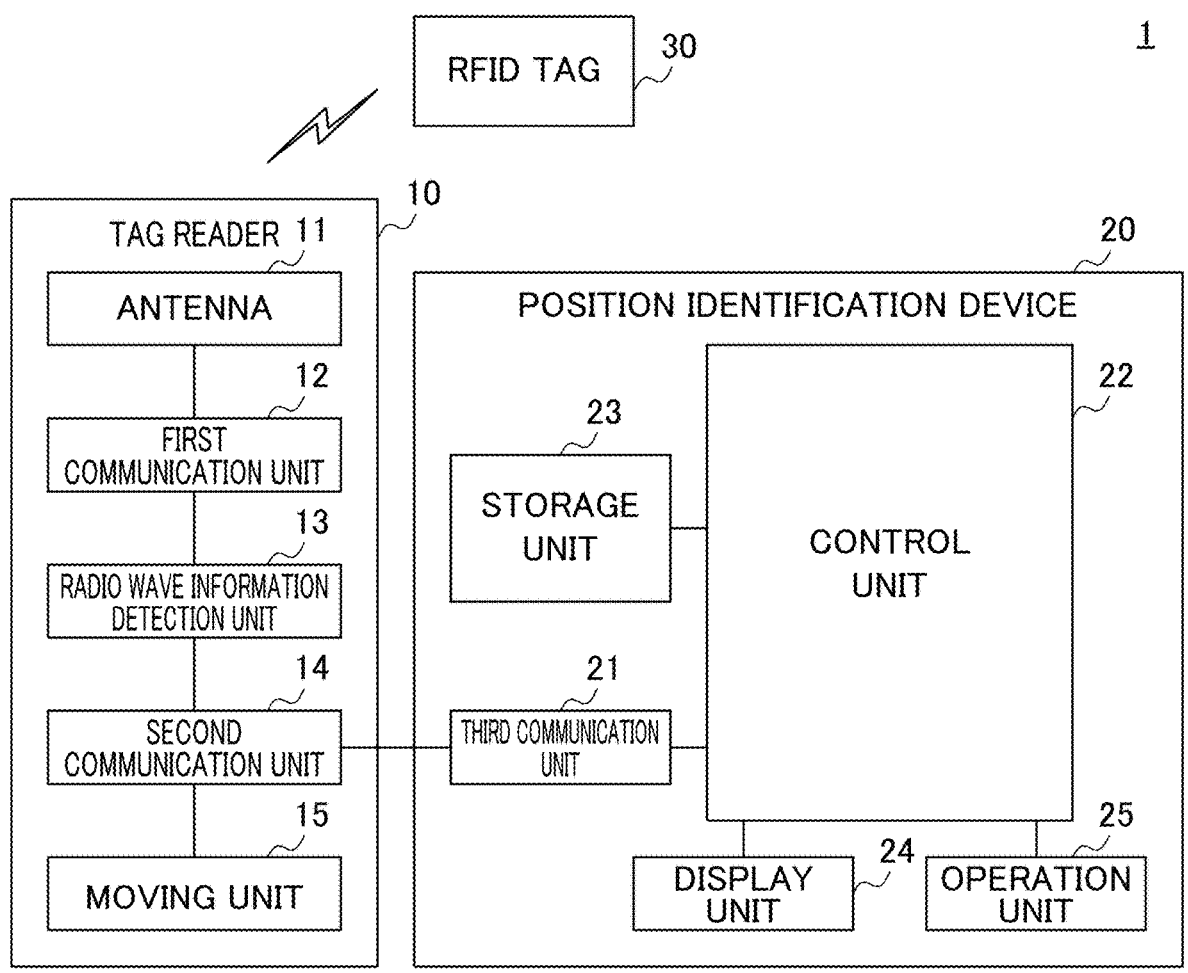
FIG. 1 is a block diagram illustrating the functional structure of a position detection system in the present embodiment.

FIG. 1 is a block diagram illustrating the functional structure of the position detection system 1 in the present embodiment. The position detection system 1 includes a tag reader 10 and a position identification device 20.

The tag reader 10 performs radio communication with an RFID tag 30 by radio waves. The frequency band of radio waves used for radio communication may be, for example, an ultra high frequency (UHF) band, but is not limited thereto. Since the wavelength of the UHF band is about 30 cm and is close to the movement distance (e.g., about 5 cm to 15 cm) of an antenna 11, which will be described later, the wavelength of the UHF band is preferable. Thus, it is preferable to select a frequency band in which the wavelength is equal to or several times the movement distance of the antenna 11. The tag reader 10 includes the antenna 11, a first communication unit 12, a radio wave information detection unit 13, a second communication unit 14, and a moving unit 15.

The antenna 11 transmits and receives radio waves to and from the RFID tag 30. Incidentally, the antenna 11 has a directivity, and strongly receives the radio waves having the path corresponding to the direction.

The first communication unit 12 communicates wirelessly with the RFID tag 30 via the antenna 11 using radio waves of a predetermined frequency. That is, the first communication unit places a transmission signal on a carrier wave of a predetermined frequency, transmits the signal to the RFID tag 30 via the antenna 11, and receives a radio wave sent back with a signal of information stored in the RFID tag 30 via the antenna 11.

The radio wave information detection unit 13 detects information on the received radio wave. This information on the radio wave includes at least one of the strength of the received radio wave (e.g., received signal strength indicator, hereinafter referred to as RSSI), the phase thereof, and the number of times signals were successfully read per unit time (e.g., 1 second, 0.1 second, etc.). Here, the radio wave information detection unit 13 calculates the phase by comparing the radio wave received from the RFID tag 30 with the reference wave of the tag reader 10. Then, since the phase is determined according to the distance between the tag reader 10 and the RFID tag 30, the radio wave information detection unit 13 can detect the phase unique to the position of the antenna 11. Therefore, for example, with the movement of the antenna 11, the difference between the phases detected respectively before and after the movement is constant regardless of the timing of the detection.

The second communication unit 14 communicates with the position identification device 20 that detects the position of the RFID tag 30. The communication method is not limited, and a wired or wireless conventional method can be employed. When a wireless method is employed, it is preferable to use a frequency band that differs from the UHF band, for example, Bluetooth (registered trademark) or the like so as not to hinder the communication with the RFID tag 30.

The moving unit 15 changes the direction of the antenna 11, and moves the position of the antenna 11 with respect to the RFID tag 30. The moving unit 15 may move only the antenna 11, or may include a mechanism for moving the tag reader 10 itself. For example, the tag reader 10 may be disposed on an automatic carrier, a drone, or the like.

The position identification device 20 is an information processing device (computer) capable of communicating with the tag reader 10, and may be a general-purpose device such as a smart phone, a personal computer, or a tablet terminal, or may be a special-purpose device, for example.

The position identification device 20 includes a third communication unit 21 (a radio wave information acquisition unit, a movement information acquisition unit), a control unit 22, a storage unit 23, a display unit 24, and an operation unit 25.

The third communication unit 21 communicates with the tag reader 10 by a predetermined communication method. Specifically, the third communication unit 21 transmits a command to the moving unit 15 under the control of the control unit 22, receives information on a radio wave detected by the tag reader 10, and provides the information to the control unit 22. In the control unit 22, information on the ID stored in a tag and the radio wave that has been detected by the tag reader 10 is provided each time the information is detected, and is stored together with the time information as data.

Note that, to simplify the description, the control unit 22 is described as a single unit, but the present invention is not limited thereto. For example, it may be configured such that the detected position information is transmitted to a server (not shown), and processing such as determination of the position and false detection, which will be described in detail below, is performed by the server, and the position identification device 20 causes feedback information received from the server to be displayed on the display unit 24. Hereinafter, the server is omitted, and the operation of the control unit 22 will be described in a simplified manner.

Figure 2:
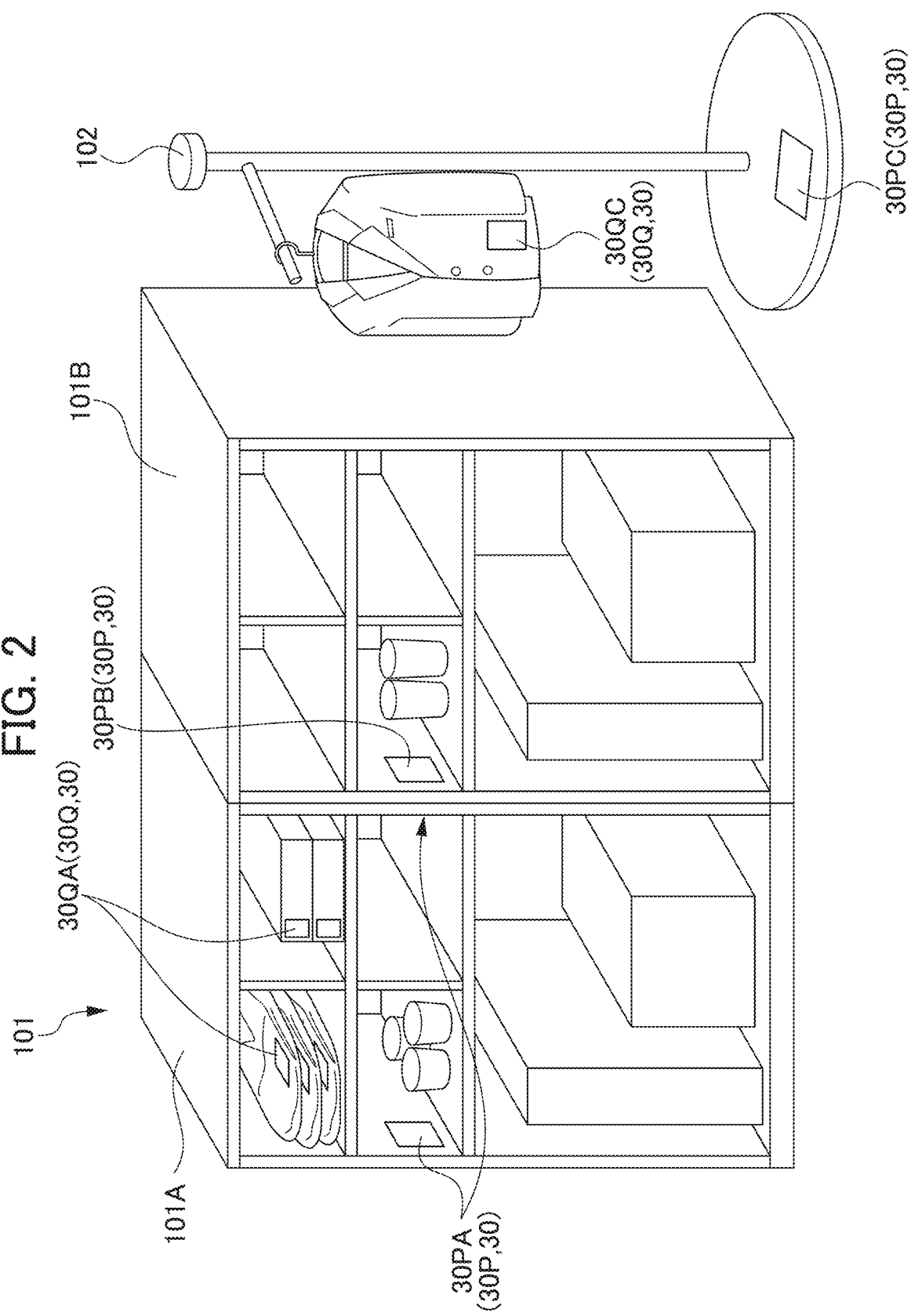
FIG. 2 is a diagram illustrating a state of a store in the present embodiment.

FIG. 2 illustrates a state of a store in the present embodiment. Shelves 101 and a hanger rack 102 are ordinary shelves and an ordinary hanger rack that are used in stores and distribution bases. A plurality of product items are displayed on the shelves 101 and the hanger rack 102. The RFID tag 30 is attached to each product item. The RFID tag 30 needs to only be fixed to the item, and the fixing mode is not limited to attachment. The RFID tags 30 for indicating the position information are also attached to the shelves 101 and the hanger rack 102. The RFID tag 30 needs to only be disposed in a placement area where the items are placed, and the disposing mode is not limited to attachment.

Hereinafter, to distinguish the tags attached to product items from those attached to shelves or a hanger rack, the RFID tag 30 attached to the product item is also referred to as a product RFID tag 30Q, and the RFID tag 30 attached to a fixture such as a shelf or a floor to indicate a location is also referred to as a position RFID tag 30P, to indicate the two separately. In addition, the leftmost shelf 101 in FIG. 2 is also referred to as 101A, and the middle shelf in FIG. 2 is also referred to as 101B. The RFID tags 30P attached to the respective shelves are also referred to as 30PA and 30PB, and the RFID tag 30P attached to the hanger rack 102 is also referred to as 30PC, to indicate the three separately.

When the position detection system 1 shown in FIG. 1 is used in front of the fixture, as the position detection system 1 transmits radio waves for detection, all of the RFID tags 30 receiving the radio waves transmit radio waves according to the stored content. Therefore, the position detection system 1 receives a plurality of response radio waves transmitted from the product RFID tag 30Q attached to the product item and the position RFID tag 30P attached to the fixture.

If the position detection system 1 receives a radio wave with more than a predetermined RSSI from the position RFID tag 30PA at a first time, it can be considered that the position detection system 1 was positioned in front of the shelf 101A at the first time. The period of time during which a certain period of time such as one second elapses or the period of time until a radio wave with more than a predetermined RSSI from another position RFID tag 30PB is received, whichever is shorter, is regarded as the staying time during which the position detection system 1 was positioned in front of the shelf 101A. Then, the position detection system 1 recognizes all of the response radio waves with more than the predetermined RSSI received from the product item RFID tags 30Q detected during the staying time as the response radio waves from the product items displayed on the shelf 101A, and registers the response radio waves in a database.

Here, although there may be one position RFID tag 30PA for indicating the shelf 101A, in view of attenuation of radio waves, when the lateral width of the shelf 101A exceeds 1 m, a plurality of position RFID tags 30PA may be attached to both sides of the shelf, for example.

Then, when the inspection of the shelf 101 is completed, and the user moves the position of the position detection system 1 to the front of the shelf 101B, the received radio waves from the position RFID tag 30PA gradually attenuate, and the radio waves from the position RFID tag 30PB are detected more strongly instead. Then, the position detection system 1 determines that the position detection system 1 is positioned in front of the shelf 101B when a radio wave from the position RFID tag 30PB exceeds a predetermined RSSI, recognizes all of the response radio waves received from the product item RFID tags 30Q during the staying time, which is the time during which the predetermined period of time of one second elapses or the period of time until a radio wave from another position RFID tag 30P (30PA or 30PC) is received, as described above, as the response radio waves from the product items displayed on the shelf 101B, and registers the radio waves in the database.

Hereinafter similarly, the position detection system 1 recognizes all of the product item RFID tags 30Q detected in front of the hanger rack 102 during the staying time where a radio wave from the position RFID tag 30P exceeds a predetermined RSSI, as the product RFID tags attached to the product items displayed on the hanger rack 102, which enables all of the product items in the store to be managed in association with the fixtures.

Then, when the product item is sold, the product item RFID tag 30Q of the product is read by a point-of-sale (POS) system in a cash register, whereby the product item RFID tag 30Q of the product is deleted from the database as already sold. When the number of particular product items decreases from a particular fixture, the database notifies the terminal of warehouse staff that the number of the products on display has decreased, and prompts them to replenish the products in the store. Since the position detection system 1 shown in FIG. 1 is portable, the product items displayed on the fixture can be updated sequentially by holding the position detection system 1 and replenishing the products. That is, when replenishing product items, the position detection system 1 is always positioned in front of the fixture where the products are to be replenished, and reads the product item RFID tag 30Q attached to a newly replenished product item and the position RFID tag 30P attached to the fixture to record the replenishment, so that a new product item code is added to the database, and the data of the product items displayed in the store is updated.

Incidentally, the strength of the radio wave emitted by the RFID tag 30 is not so strong, and the strength of the radio wave RSSI received by the position detection system 1 is attenuated in proportion to the square of the distance. Thus, it is possible to determine which fixture the position detection system is staying in front of by appropriately setting the reference RSSI strength. However, radio waves from a plurality of position RFID tags 30P may be detected in the same period of time, since the reception of radio waves from another position RFID tag 30P positioned nearby is not completely eliminated. In this instance, if the ratio between the reception strength RSSI-A from a first position RFID tag 30PA and the reception strength RSSI-B from a second position RFID tag 30PB is more than twice, or if the number of readings of one of the position RFID tags 30P is more than twice that of the other of the position RFID tags 30P at a predetermined time, it may be determined that the one of the position RFID tags 30P is close and the other of the position RFID tags 30P is far. While the radio wave of any of the position RFID tags 30P does not reach this reference value, or while the radio waves of a plurality of position RFID tags 30P are detected with close reception strength RSSI, it is determined that this is the period of time when the user with the position detection system is moving from the front of a shelf to the front of a next shelf. Then, only the presence of the codes of the detected product items can be updated, while the updating of the position information can be suspended.

[Use of Map Information]

Figure 3:
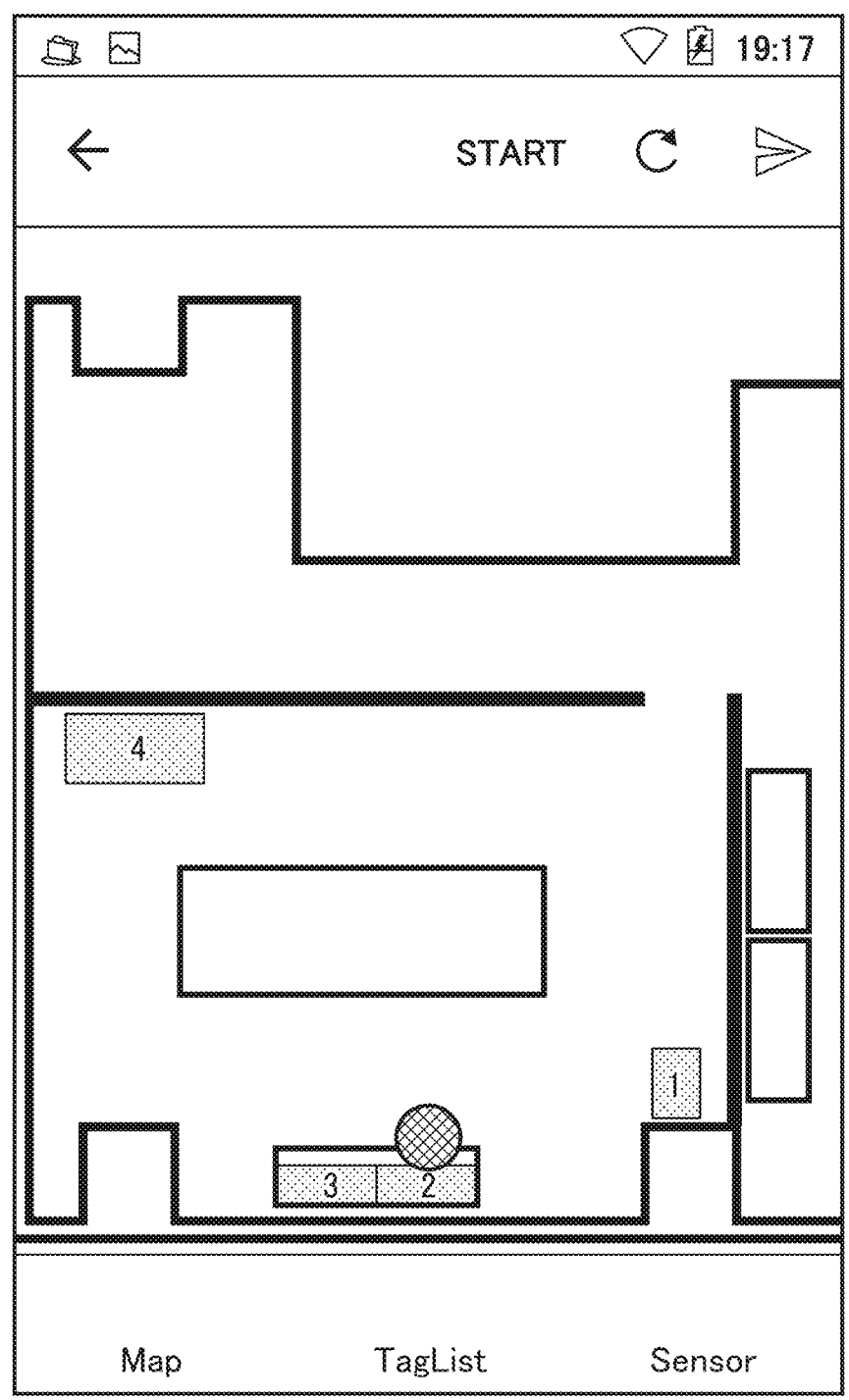
FIG. 3 illustrates an example of map information showing the positions of fixtures in the store displayed in the display device mounted on the position detection system.

FIG. 3 illustrates an example of map information showing the positions of fixtures in the store that is displayed in the display device mounted on the position detection system. When the same fixtures are used in a plurality of stores, such as chain stores, the information on the fixtures can be displayed by downloading data registered in advance in a predetermined database. Alternatively, since most of the fixtures are generally rectangular solids, and the plan view can be simply shown by rectangles, the sizes of the fixtures on the map may be set by actually measuring the sizes of the fixtures in the store. If the display device is equipped with a touch panel, the sizes of the fixtures may be set by pinching on the screen. Then, unique IDs are assigned to all fixtures arranged in the store, and the ID is stored in the storage area of the position RFID tag 30P. When a product is displayed on a wall or the like of the store without using a fixture, the wall may also be given an ID as required, and a position RFID tag 30P may also be attached to the wall.

In this manner, by building a database by associating the position information of fixtures with product items in the store, it is possible to easily manage the inventory of the product items displayed in the store at the time of opening and closing the store. In the case of a large store, it is necessary for a plurality of store clerks to divide inventory work. In the position detection system 1 of the present embodiment, in the inventory management mode, when the inventory management of a certain fixture is completed, that is, when a product item ID associated with a position RFID tag 30P detected during a period of time is registered and updated in the database, an inventory completion flag for the position ID is generated in the management server of the store and transmitted to the position information systems held by the store clerks. The map information displayed on the display device mounted on each position information system displays the fixture, in which the inventory completion flag is indicated, in a color with reduced saturation and brightness, and can notify other store clerks of the inventory completion.

When the position detection system 1 recognizes that it is staying in front of a certain fixture, the position detection system 1 displays the recognized position as a bright spot.

When it is necessary to replenish a product displayed in the store, the product item and the fixture of the replenishment destination are recognized in advance. When reading the product item RFID tag 30Q of the product item to be replenished, the position detection system held by a store clerk in charge of replenishment flashes the fixture of the replenishment destination in the map information displayed on the display device or displays the fixture with increased brightness, to display the fixture distinctively. The store clerk in charge of replenishment registers the replenishment in front of the target fixture in the position detection system 1, and the position detection system 1 updates the database by associating the information of the position RFID tag 30Q detected during the period of time with the ID of the product item. Thus, according to the position detection system 1 of the present embodiment, in addition to inventory before opening and after closing of the store, inventory management can be performed at any time during the opening of the store.

[Measures against False Detection of Position RFID Tag]

Figure 4:
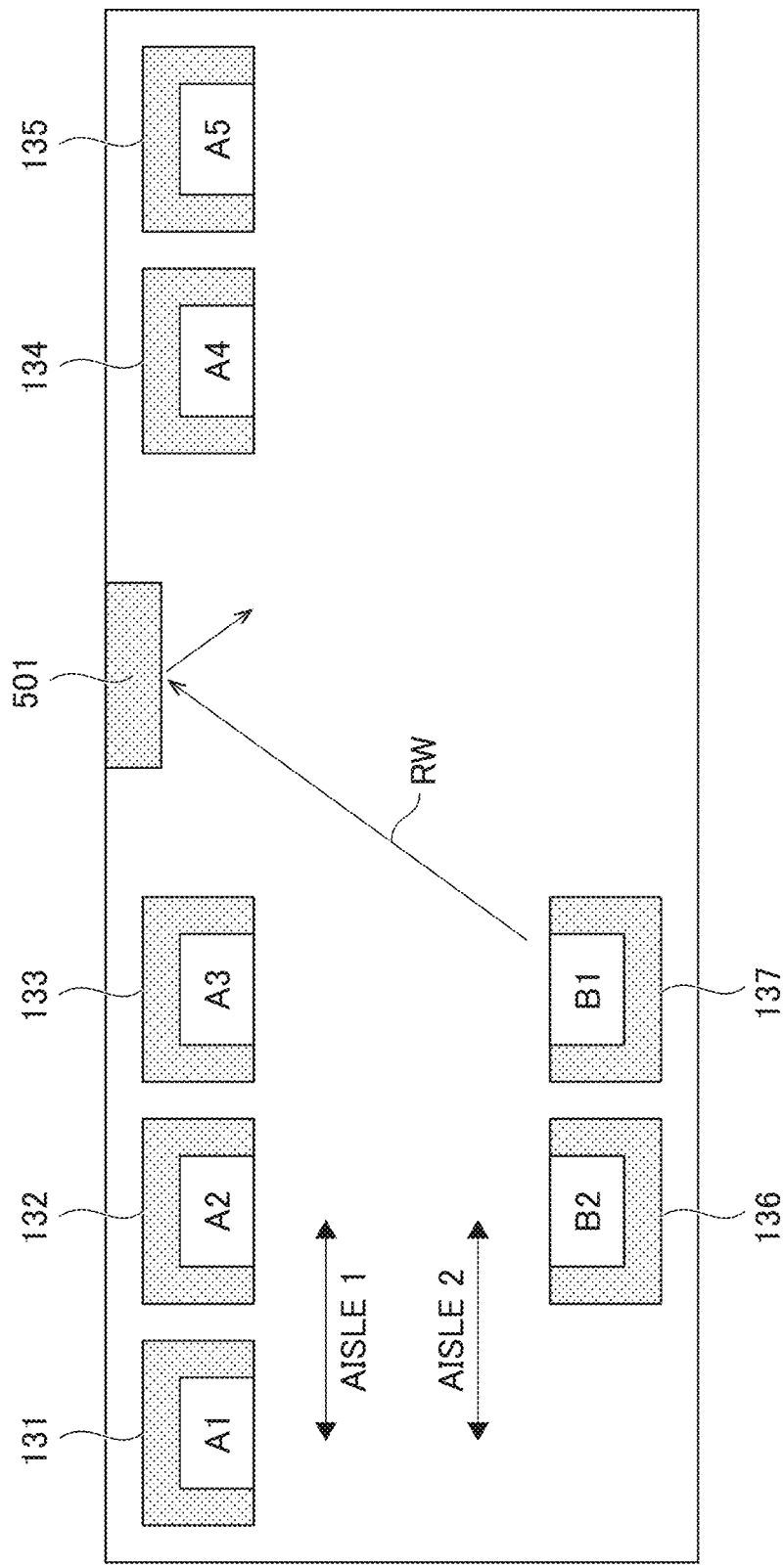
FIG. 4 is an arrangement diagram illustrating a state of the store in the present embodiment.

When the position detection system described above was applied to an actual store environment, it has been found that a position RFID tag 30P may be incorrectly detected in a situation where it is not assumed that the position RFID tag 30P will be detected. FIG. 4 is a diagram simulating an actual store environment. Shelves 131, 132, 133, 134, and 135 have openings that open to the lower side of FIG. 4, respectively. The position RFID tags 30P having position IDs A1, A2, A3, A4, and A5 are respectively attached to the shelves. A mirror 501 is installed on a wall surface between the shelf 133 and the shelf 134, for example, for the purpose of checking the appearance of the customer trying on clothes. Shelves 136 and 137 are arranged on the lower side of FIG. 4 across aisles 1 and 2. The shelves 136 and 137 have openings that open to the upper side of FIG. 4.

The aisle 1 is an aisle through which a store clerk holding the tag reader 10 detects products placed on the shelves 131, 132, 133, 134, and 135. Therefore, the store clerk passing through the aisle 1 points the antenna 11 of the tag reader 10 to face the direction, in which the directivity of the antenna 11 of the tag reader 10 is maximized, toward the upper side of FIG. 4.

The aisle 2 is an aisle through which a store clerk holding the tag reader 10 detects products placed on the shelves 136 and 137. Therefore, the store clerk passing through the aisle 2 points the antenna 11 of the tag reader 10 to face the direction, in which the directivity of the antenna 11 of the tag reader 10 is maximized, toward the lower side of FIG. 4.

Since the store clerk passing through the aisle 1 detects products placed on the shelves 131, 132, 133, 134, and 135, it is assumed that the store clerk detects the IDs of the position RFID tags 30P attached to the shelves 131, 132, 133, 134, and 135 and the IDs of the product RFID tags 30Q attached to the products placed on the shelves 131, 132, 133, 134, and 135. However, since the mirror 501 has a structure in which a metallic surface is formed on the back surface of the glass, for example, the mirror 501 reflects a radio wave RW from the position RFID tag 30P attached to the shelf 137 toward the lower right direction of FIG. 4.

As described above, since the store clerk passing through the aisle 1 points the antenna 11 of the tag reader 10 to face the direction, in which the directivity of the antenna 11 of the tag reader 10 is maximized, toward the upper side of FIG. 4, the store clerk may receive the radio wave from the position RFID tag 30P attached to the shelf 137, which has been reflected by the mirror 501, and may detect the position ID "B1".

FIG. 5 illustrates an example of the detection results of the position RFID tags in the above-described case. The item "year/month/day" is information on the date on which the store clerk performed the operation of detecting the RFID tags through the aisle 1. The item "hour/minute/second" is the time at which the position RFID tag 30P was detected. The item "ID of position RFID tag" is the ID of the detected position RFID tag 30P. The item "X-coordinate" is the X-coordinate of the position of each position RFID tag 30P in the arrangement diagram of FIG. 4. The item "Y-coordinate" is the Y-coordinate of the position of each position RFID tag 30P in the arrangement diagram of FIG. 4.

The X-coordinate and the Y-coordinate of the position of each position RFID tag 30P in the arrangement diagram of FIG. 4 may be stored in the memory of each position RFID tag 30P, and may be transmitted on a response radio wave from the position RFID tag 30P. Alternatively, the correspondence between the ID of each position RFID tag 30P and the X-coordinate and the Y-coordinate of the position of each position RFID tag may be stored in advance in the management server of the store, and based on the ID of the detected position RFID tag 30P, the X-coordinate and the Y-coordinate of the position of the position RFID tag may be searched from the management server. In FIG. 5, to make the table easier to read, each position RFID tag 30P is detected only once, but as described above, since the radio waves of an RFID tag are transmitted 300 times per second, one position RFID tag 30P is actually detected a plurality of times.

Since the ID of the position RFID tag in Item No. 4 in FIG. 5 is "B1", this position ID should not be detected when the store clerk passes through the aisle 1. Therefore, it is necessary to take some measures such as deleting or masking Item No. 4 in the table of FIG. 5. Note that the data immediately after detection and including incorrectly detected data, such as the data shown in FIG. 5, is hereinafter also be referred to as "primary data". On the other hand, the data adapted to the subsequent processing by performing processing such as deleting incorrectly detected data as in Item No. 4 of FIG. 5 (including the processing for complementing data to be included as a matter of course described later) is also referred to as "secondary data".

Another example will be described in which the position RFID tag is incorrectly detected in a situation where it is not assumed that the position RFID tag will be detected.

Figure 6:
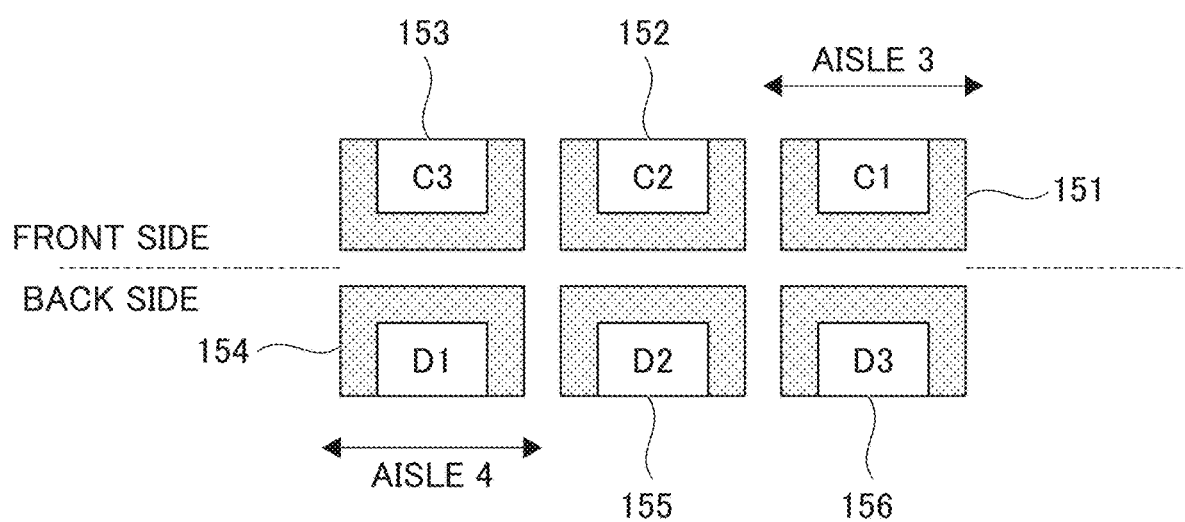
FIG. 6 is an arrangement diagram illustrating a state of the store in the present embodiment.

FIG. 6 is a diagram simulating an actual store environment. Shelves 151, 152, and 153 have openings that open to the upper side of FIG. 6, respectively. Position RFID tags 30P having position IDs C1, C2, and C3 are attached to the shelves, respectively. Shelves 154, 155, and 156 have openings that open to the lower side of FIG. 6, respectively. Thus, shelves 151 to 153 and shelves 154 to 156 are so to speak arranged back-to-back. For convenience, of the two rows of the shelves arranged back-to-back, the side of the shelves 151 to 153 is referred to as the "front side", and the side of the shelves 154 to 156 is referred to as the "back side".

An aisle 3 is an aisle through which a store clerk holding the tag reader 10 detects products placed on the shelves 151 to 153. Therefore, the store clerk passing through the aisle 3 points the antenna 11 of the tag reader 10 to face the direction, in which the directivity of the antenna 11 of the tag reader 10 is maximized, toward the lower side of FIG. 6.

An aisle 4 is an aisle through which a store clerk holding the tag reader 10 detects products placed on the shelves 154 to 156. Therefore, the store clerk passing through the aisle 4 points the antenna 11 of the tag reader 10 to face the direction, in which the directivity of the antenna 11 of the tag reader 10 is maximized, toward the upper side of FIG. 6.

The three shelves 151, 152, and 153 in FIG. 6 are installed so that there is almost no gap between each shelf. The three shelves 154, 155, and 156 in FIG. 6 are also installed so that there is almost no gap between each shelf. Therefore, the store clerk cannot move from the front side to the back side by passing between the shelf 151 and the shelf 152 or between the shelf 155 and the shelf 156. In FIG. 6, for simplification of the drawing, three shelves are installed on one side, but in an actual store, more shelves, for example, about 10 shelves are installed on one side. Thus, for example, moving from the middle shelf on the front side to the middle shelf on the back side is not easy.

Generally, when an RFID tag is attached to a metallic surface, the RFID tag cannot emit a response radio wave (for example, see paragraph 0002 of Japanese Unexamined Patent Application, Publication No. 2018-78619). In recent years, RFID tags have been attached to shelves and used, so that wooden shelves may be used instead of metallic shelves. However, since the response radio waves of RFID tags penetrate wooden shelves, for example, when the store clerk is in the aisle 3 of FIG. 6 and points the antenna 11 of the tag reader to face the direction, in which the directivity of the antenna 11 of the tag reader 10 is maximized, toward the lower side of FIG. 6, not only the response radio waves from the RFID tags on the front side but also the response radio waves from the RFID tags on the back side may be received.

FIG. 7 illustrates an example of the detection results of the position RFID tags 30P, in the case where the store clerk is in the aisle 3 in FIG. 6 as described above. In Item No. 3, "D2", which is the position ID of the shelf 155 positioned on the back side of FIG. 6, is detected. FIG. 8 illustrates an example of the detection results of the position RFID tags 30P when the store clerk passes thorough the aisle 4 and points the antenna 11 of the tag reader 10 to face the direction, in which the directivity of the antenna 11 of the tag reader 10 is maximized, toward the upper side of FIG. 6 and detect the position RFID tags 30P, approximately 30 minutes after FIG. 7. "C2" in Item No. 3 is the position ID of the shelf 152 positioned on the front side of FIG. 6.

As described above, about 10 shelves are installed on one side in FIG. 6. Therefore, if the product that is actually placed on the middle shelf on the front side is incorrectly detected as being placed on the middle shelf on the back side, and the correspondence table of the product and the placing location of the product is created, the store clerk goes to the middle shelf on the back side and finds that the product of interest is not present on the shelf. Even if the false detection is noticed, it is hard to move from the middle shelf on the back side to the middle shelf on the front side.

To delete such information of the position RFID, which is detected under the condition that the information is not supposed to be detected, from the detection results, in the present embodiment, a table in which aisles and the IDs of the position RFID tags attached to one or more placement areas arranged facing the aisles are associated with each other is prepared in advance. This "table in which aisles and the IDs of the position RFID tags attached to one or more placement areas arranged facing the aisles are associated with each other" is hereinafter referred to as an "aisle-to-position RFID tag correspondence table".

FIG. 9 illustrates an example of such an aisle-to-position RFID tag correspondence table. For example, since the shelves arranged facing the aisle 1 are the shelves 131 to 135, the IDs "A1, A2, A3, A4, and A5" of the position RFID tags attached to the shelves 131 to 135 are stored corresponding to the aisle 1.

As described in the aforementioned "Use of Map Information", when the position detection system 1 recognizes that it is staying in front of a certain fixture, the position detection system 1 displays the recognized position as a bright spot. Therefore, the position detection system 1 recognizes its own position. Although the coordinates of the aisle 1 and the aisle 2 in FIG. 4 are close to each other, it can be determined whether the store clerk is in the aisle 1 or the aisle 2 depending on whether the direction of the antenna 11 of the tag reader 10 is facing toward the upper side or the lower side of FIG. 4, when the directivity of the antenna 11 of the tag reader 10 is maximized.

The direction in which the directivity of the antenna 11 of the tag reader 10 is maximized can be detected by a gyro and/or compass built in the tag reader 10. In this case, wooden shelves as in FIG. 6 are suitable because they do not adversely affect the compass.

According to the above-described determination method, the aisle through which the store clerk has passed is determined, and the detection results of the position RFID tags are compared with the IDs of the position RFID tags corresponding to the aisle through which the store clerk has passed in the aisle-to-position RFID tag correspondence table. For example, when it is determined that the aisle through which the store clerk has passed is the aisle 1, it is determined that the data of the position ID "B1" in Item No. 4 should be deleted based on the detection results in FIG. 5 and the IDs of the position RFID tags corresponding to the aisle 1 in FIG. 9.

When it is determined that the aisle through which the store clerk has passed is the aisle 3, it is determined that the data of the position ID "D2" in Item No. 3 should be deleted based on the detection results in FIG. 7 and the IDs of the position RFID tags corresponding to the aisle 3 in FIG. 9.

When it is determined that the aisle through which the store clerk has passed is the aisle 4, it is determined that the data of the position ID "C2" in Item No. 3 should be deleted based on the detection results in FIG. 8 and the IDs of the position RFID tags corresponding to the aisle 4 in FIG. 9.

The above description has been made using cases where the IDs of the position RFID tags 30P are incorrectly detected as examples. However, the fact that a response radio wave from an RFID tag is reflected by a mirror or penetrates a wooden shelf is not a phenomenon limited to a position RFID tag. A response radio wave from a product RFID tag is also reflected by a mirror or penetrates a wooden shelf.

However, since the position detection system of the present invention originally aims at checking what types of products are placed and where, information on what types of products are placed facing which aisles is unknown. Therefore, for product RFID tags, the method using an aisle-to-position RFID tag correspondence table cannot be used.

The strength of a received radio wave (RSSI) of a response radio wave that has been reflected by a mirror is lower than that of a response radio wave that has not been reflected by a mirror. The RSSI of a response radio wave that has penetrated a wooden shelf is lower than that of a response radio wave that has not penetrated a wooden shelf. Therefore, with respect to product RFID tags, the adoption/non-adoption of a detection result can be determined based on the RSSI.

FIG. 10 illustrates an example of the detection results of the product RFID tags when detection in FIGS. 7 and 8 was performed. In FIG. 10, the ID "a1" of the same product RFID tag was detected in Item Nos. 15 and 28. Since the time "14:25:15" of Item No. 15 in FIG. 10 is the same as the time "14:25:15" of Item No. 2 in FIG. 7, according to Item No. 15 in FIG. 10, the product with the product item ID "a1" is positioned on the shelf 152 in FIG. 6. On the other hand, since the time "14:53:47" of Item No. 28 in FIG. 10 is the same as the time "14:53:47" of Item No. 2 in FIG. 8, according to Item No. 28 in FIG. 10, the product with the product item ID "a1" is positioned on the shelf 155 in FIG. 6.

As described above, the period of time during which a certain period of time elapses from a first time when the position detection system 1 has received a radio wave with more than a predetermined RSSI from the position RFID tag 30PA, or the period of time until a radio wave with more than a predetermined RSSI of another position RFID tag 30PB is received, whichever is shorter, is regarded as the staying time during which the position detection system 1 was positioned in front of the shelf 101A. Further, as described above, the position RFID tag 30P and the product RFID tag 30Q emit response radio waves 300 times per second. Therefore, the detection time of the product RFID tag 30Q does not need to be completely the same as the detection time of the position RFID tag 30P. If the detection time of the product RFID tag 30Q falls within the above-mentioned staying time, it is possible to determine which position RFID tag 30P the detected product RFID tag 30Q is positioned in the same location as.

Here, the RSSI column in FIG. 10 will be referred to. The RSSI of Item No. 15 is "−73 dBm", and the RSSI of Item No. 28 is "−58 dBm". The RSSI of Item No. 28 is higher than that of Item No. 15. Therefore, it can be determined that the product with the product item ID "a1" is positioned on the shelf 155 in FIG. 6.

To simplify the description, in FIG. 7, only D2 is listed in the table as a position RFID tag 30P on the back side, but actually, in addition to D2, D1 and D3 are also detected. When it is determined that the store clerk is in the aisle 3, the data of D1 and D3 are also deleted in the same manner as the data of D2.

In the above description, as for the IDs of the position RFID tags 30P, the IDs were used in such a way that the aisle toward which the position RFID tag is disposed to be facing can be inferred from the position ID. However, this is to facilitate understanding of the embodiment. Since the correspondence between the aisles and the IDs of the position RFID tags attached to one or more placement areas disposed to be facing the aisles is maintained by the aisle-to-position RFID tag correspondence table, it is evident that the IDs do not have to be such that the aisles can be inferred. For example, the position ID of the position RFID tag may be "4286", "7891", or the like, from which the aisle, which the position RFID tag is disposed to be facing, cannot be inferred.

[Measures to be taken when there is a Spatial Gap between Two Position RFID Tags Temporally Continuously Detected as Primary Data]

In the cases of the reflection by a mirror and wooden shelves arranged back-to-back described above, position RFID tags 30P that were not to be detected were detected, and the data of the position RFID tags 30P which were not to be detected were deleted from the primary data of the detected position RFID tags 30P. Alternately, a problem that a position RFID tag 30P that was to be detected was not detected may also occur.

Figure 11:
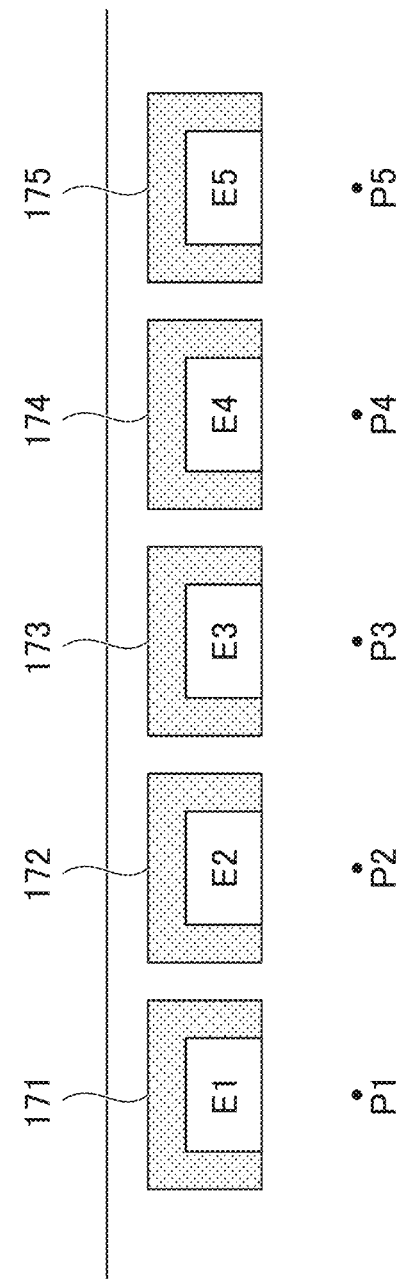
FIG. 11 is an arrangement diagram illustrating a state of the store in the present embodiment.

For example, in FIG. 11, shelves 171 to 175 are arranged side by side. E1 to E5 are the position IDs of the position RFID tags 30P attached to the shelves 171 to 175, respectively. P1 to P5 are positions where the store clerk stands in front of each shelf when inspecting the products on each of the shelves 171 to 175. It is assumed that the store clerk has inspected the products on the shelf 171, then the products on the shelf 172, and now has stood at the position P3 in front of the shelf 173 to inspect the products on the shelf 173.

The store clerk who is accustomed to the inspection work by the position detection system knows to which part of the shelf the position RFID tag 30P is attached. The store clerk standing at the position P3 in front of the shelf 173 first points the antenna 11 of the tag reader 10 toward the position RFID tag 30P attached to the shelf 173 to read the position RFID tag 30P attached to the shelf 173. Next, the store clerk sequentially points the antenna 11 of the tag reader 10 toward the products placed on the shelf 173 to read the product RFID tags 30Q attached to the products placed on the shelf 173. At this time, the store clerk swings the direction of the antenna 11 of the tag reader 10 left and right, without moving from the position P3. The operation of swinging the direction of the antenna 11 of the tag reader 10 is illustrated as a swinging operation H in a horizontal plane in FIG. 1 of Patent Document 1 by the present applicant. At this time, a radio wave may be received from the position RFID tag 30P of a nearby shelf.

That is, when the position IDs of the position RFID tags 30P with the largest RSSI every second are arranged in chronological order, "E3, E1, E3, E5, and E3" may be detected in this sequence. FIG. 12 illustrates an example of the primary data of such position RFID tags 30P.

In FIG. 12, the position ID "E3" was detected at 13:14:50, and the position ID "E1" was detected at 13:14:51. However, in consideration of the arrangement of the shelves in FIG. 11, it is difficult to consider that the position ID "E1" was detected after the position ID "E3" was detected without detecting the position ID "E2". It is reasonable to consider that the position ID "E2" should have been detected between the detection of the position ID "E3" and the detection of the position ID "E1". Based on this idea, at 13:14:50.5, between Item No. 1 and Item No. 2 in FIG. 12, data indicating that the position ID "E2" was detected is added.

Similarly, at 13:14:51.5, between Item No. 2 and Item No. 3 in FIG. 12, data indicating that the position ID "E2" was detected is added. Similarly, at 13:14:52.5, between Item No. 3 and Item No. 4 in FIG. 12, data indicating that the position ID "E4" was detected is added. Similarly, at 13:14:53.5, between Item No. 4 and Item No. 5 in FIG. 12, data indicating that the position ID "E4" was detected is added.

FIG. 13 illustrates the secondary data of the detected position RFID tags 30P obtained in this manner. Star icons (*) indicate rows to which the user made an entry. In this manner, the primary data of the detected position RFID tags 30P is processed so that the temporal arrangement of the detected position IDs matches the spatial arrangement of the shelves.

The processing of the primary data of the detected position RFID tags 30P can be performed using an adjacency matrix as shown in FIG. 14 or an adjacency list as shown in FIG. 15. Since the adjacency matrix and the adjacency list record all the adjacent relationships among the shelves, the processing of the primary data of the detected position RFID tags 30P can be performed using the adjacency matrix or the adjacency list. Since the adjacency matrix and the adjacency list are well-known concepts, description of the adjacency matrix and the adjacency list themselves is omitted.

If the position IDs of two position RFID tags temporally continuously detected are Ei and Ej, respectively, it is possible to confirm whether Ei and Ej are spatially adjacent using an adjacency matrix or an adjacency list.

In FIG. 12, a case where another position RFID tag 30P is spatially present between two position RFID tags 30P that were temporally continuously detected has been described. However, even when two or more other position RFID tags 30P are spatially present between two position RFID tags 30P that were temporally continuously detected, the data of the two or more other position RFID tags 30P can be complemented. For example, when the position ID "E5" was detected next to the position ID "E2" in time, the position information corresponding to the plurality of position IDs of the position IDs "E3" and "E4" can be complemented.

When the two position RFID tags Ei and Ej that were temporally continuously detected are not spatially adjacent, various algorithms are conceivable for determining the position RFID tags to be complemented using an adjacency matrix or an adjacency list. FIG. 16 illustrates an example thereof.

First, the upper limit $N_{max}$ of the number of the position RFID tags to be complemented between Ei and Ej is determined. In Step S101, the control unit 22 determines whether Ei and Ej are spatially adjacent to each other using an adjacency matrix or an adjacency list. If Ei and Ej are spatially adjacent to each other (S101: YES), the process ends. If Ei and Ej are not spatially adjacent (S101: NO), the process proceeds to Step S103.

In Step S103, using the adjacency matrix or the adjacency list, the control unit 22 adds a position RFID tag adjacent to E1. At the same time, the control unit 22 sets the variable "n" indicating the number of position RFID tags added to "1". Next, the process proceeds to Step S105.

In Step S105, the control unit 22 determines whether the variable n indicating the number of position RFID tags added has reached ($N_{max}$+1). When the variable n indicating the number of position RFID tags added has reached ($N_{max}$+1) (S105: YES), the control unit 22 displays an error and terminates the process. When the variable n indicating the number of position RFID tags added has not reached ($N_{max}$+1) (S105: NO), the process proceeds to Step S107.

In Step S107, using the adjacency matrix or the adjacency list, the control unit 22 determines whether Ei to Ej is spatially continuous. If Ei to Ej is spatially continuous (S107: YES), the process ends. If Ei to Ej is not spatially continuous (S107: NO), the process proceeds to Step S109.

In Step S109, using the adjacency matrix or the adjacency list, the control unit 22 adds a position RFID tag spatially adjacent to the previously added position RFID tag. At the same time, the control unit 22 increments the variable n by one. Thereafter, the process returns to Step S105.

Processing of primary data into secondary data may be performed in the position identification device 20, or may be performed in the management server of the store configured to communicate with the position identification device 20. It is more preferable that the position identification device 20 is configured to switch between the mode (terminal processing mode) in which this processing is performed in the position identification device 20 and the mode (server processing mode) in which this processing is performed in the management server of the store.

In the case where the information on the adjacent relationships among fixtures, such as the adjacency matrix in FIG. 14 or the adjacency list in FIG. 15, is provided, the processing described below can be performed. In the example of FIG. 5, since A3, B1, and A4 were detected in this sequence, this sequence is discontinuous in the position of the fixture and the direction of the opening. If A3, B1, and B2 are detected in this sequence, A3 to B1 is discontinuous, but B1 to B2 is continuous. Therefore, it is considered that the store clerk did not proceed through the aisle 1, but turned around and moved to the aisle 2, and therefore, it is not regarded as false detection. Thus, it can be determined from the registered positions of the fixtures that A3 and A4 are adjacent to each other, that the position of B1 is discontinuous to A3 or A4, and/or it can be determined from the registered directions of the openings of the fixtures that the direction of the opening of A3 and the direction of the opening of A4 are the same, and that the direction of the opening of B1 is opposite to the direction of the opening of A3 or A4. The detection results of the position RFID tags may be displayed on the display unit 24 of the position identification device 20, and when it is determined that there is a possibility of false detection, it may be displayed to prompt the store clerk to check whether it is false detection prior to deleting or masking.

As described above, in RFID standard, transmission and reception of radio waves are repeated 300 times per second between a position detection system and an RFID tag. Periods of time other than the period of time in which it is determined that the user is staying in front of a fixture are the periods of time during which the user is moving between fixtures. It is difficult to associate the information of a product item detected during this moving time with the position information, and the priority of updating the database is not high. The method disclosed in Patent Document 1 enables detection of the position of a target fixture, and even when a store clerk is unfamiliar with a wide store, the store clerk can be guided by a map display. However, if radio waves are received from many product item RFID tags 30Q, route guidance to the fixture may be hindered. Therefore, to determine the placement area reading history with high accuracy by the method of Patent Document 1, a position information priority reading mode may be set, and during the position information priority reading mode, a filter may be applied to read and respond to only position RFID tags at predetermined intervals.

As described above, fixtures in the store can be easily reflected on map information, but rearrangement of the fixtures is often performed in an actual store. In this case, it is better to be able to change the position of a fixture displayed on the map information by dragging the fixture.

There may also be an area in the store where no fixture is arranged. While the position detection system 1 passes through such a location, the information of the position RFID tags 30P is not obtained, and thus there is a possibility that accurate position detection cannot be performed. The position detection system 1 of the present embodiment uses a smartphone as the position identification device. Since a direction sensor and an acceleration sensor are generally mounted on a smartphone, by combining the information from the position RFID tags 30P attached to peripheral fixtures with the information of the direction sensor and the acceleration sensor of the smartphone, even when the store clerk is passing through an area distant from fixtures, or even when a product item RFID tag 30Q is read when the product item is displayed in an area to which the position RFID tag 30P is not attached, the display position can be determined. More specifically, the present position can be calculated from the final information of the determined position information based on the last position RFID tag 30P whose radio wave exceeds a predetermined strength, and the subsequent histories of the direction sensor and the acceleration sensor.

Further, for convenience of changing the layout of the store, it may be desired to display products in an area where no position RFID tag 30P is disposed. For such a case, the position detection device of the present embodiment includes a manual registration mode. In the manual registration mode, by touching or clicking a predetermined position of the map information displayed on the display device and subsequently reading the product item RFID tag 30Q at a close distance, the product item ID can be registered in association with the coordinate information on the map even in an area to which the position ID is not provided.

Note that, for the sake of simplicity, the description up to this point has exemplified the case where one position ID is assigned to one shelf, but the present invention is not limited thereto. One position ID may be assigned to a plurality of shelves to avoid data complexity. Conversely, a single shelf can be divided into a plurality of parts to assign position IDs for more detailed management. When managing in more detail, if the distances among different position RFID tags 30P are too close to one another, radio waves from a plurality of position RFID tags 30P may exceed a predetermined strength RSSI, and thus accurate position recognition may be difficult. In this case, interference may be prevented by using a material for shielding radio waves, such as a metal plate, for the shelf plate.

Further, similarly to the strength of the radio wave RSSI, it can be similarly implemented by utilizing the number of times signals were successfully read per unit time.

In the embodiment described above, the product item RFID tag 30Q and the position RFID tag 30P have been described without being distinguished from each other, but the present invention is not limited thereto. Since the RFID tags 30Q to be attached to product items are used in large quantities and need to be carried around, they need to be as inexpensive, lightweight, and compact as possible. On the other hand, since the number of the position RFID tags 30P used is small, and the tags are not carried around, the tag may have a size that does not hinder the display of products.

The receiving position at which the position signal is received is not limited to an aisle, and may be, for example, each region as a result of dividing the floor through which the store clerks pass for inspection into a plurality of regions.

In the memory of the position RFID tag 30P, an ID enabling a fixture to be identified may be simply registered, or in addition to this, information on the position of the fixture and the direction of the opening may be coded and registered. In addition, information on the position of the fixture and the direction of the opening may be managed by a server instead of writing the information in the position RFID tag 30P. If the information on the position of the fixture and the direction of the opening are written in the position RFID tag 30P, there is an advantage that the position identification device 1 can instantly determine the position of the fixture and the direction of the opening without communicating with a server. On the other hand, if the information on the position of the fixture and the direction of the opening is managed by a server, the information held by the position RFID tag 30P does not need to be updated when the position of the fixture or the direction of the opening is changed due to redecoration of the floor of the store or the like.

EXPLANATION OF REFERENCE NUMERALS

1 position detection system
10 tag reader
11 antenna
12 first communication unit
13 radio wave information detection unit
14 second communication unit
15 moving unit
20 position identification device
21 third communication unit
22 control unit
23 storage unit
24 display unit
25 operation unit
30 RFID tag (storage medium)
101 fixture (shelf)
102 fixture (hanger rack)
131 fixture (shelf)
132 fixture (shelf)
133 fixture (shelf)
134 fixture (shelf)
135 fixture (shelf)
136 fixture (shelf)
137 fixture (shelf)
151 fixture (shelf)
152 fixture (shelf)
153 fixture (shelf)
154 fixture (shelf)
155 fixture (shelf)
156 fixture (shelf)
171 fixture (shelf)
172 fixture (shelf)
173 fixture (shelf)
174 fixture (shelf)
175 fixture (shelf)
501 mirror

The invention claimed is:

1. A position detection system configured to:
identify position information based on a position signal received from a first storage medium disposed in a placement area where a target item is placed;
identify item information based on an item signal received from a second storage medium fixed to the target item; and
associate the position information with the item information and store the associated information when receiving the item signal within a predetermined period of time from a time when the position information was identified,
wherein, when not receiving the position signal within the predetermined period of time from a time when the item information was identified, the process of associating the item information with the position information and storing the associated information are not performed, and the receiving the position signal and the receiving the item signal are continued.

2. The position detection system according to claim 1, wherein, when the position signals are received from a plurality of the first storage media disposed in different placement areas and when the ratio of the strength of a certain position signal to the strength of the other position signal exceeds a predetermined ratio, or the ratio of the number of times the certain position signal is read to the number of times the other position signal is read exceeds the predetermined ratio, the position information is identified based on the certain position signal.

3. The position detection system according to claim 1, wherein whether or not to adopt the identified position information as a candidate for position information to be associated with the item information is determined based on one or more identification information of the first storage media recorded in advance corresponding to a receiving position at which the position signal is received.

4. The position detection system according to claim 3, wherein, when identification information of the first storage medium recorded in the position signal received is not included in one or more of the identification information of the first storage media recorded in advance, the position information identified is not adopted.

5. The position detection system according to claim 3, wherein whether or not to adopt the position information as a candidate for position information to be associated with the item information based on the receiving position at which the position signal is received is determined based on a direction in which a directivity of an antenna is maximized when the position signal is received.

6. The position detection system according to claim 1, wherein, when there are one or more other placement areas between two placement areas corresponding to two position information temporally continuously detected, position information of the one or more other placement areas is complemented between the two position information temporally continuously detected.

* * * * *